Aug. 25, 1964     P. G. PEROTTO     3,146,342
OLD BALANCE PICK-UP DEVICE FOR AN ACCOUNTING MACHINE
Filed April 6, 1962
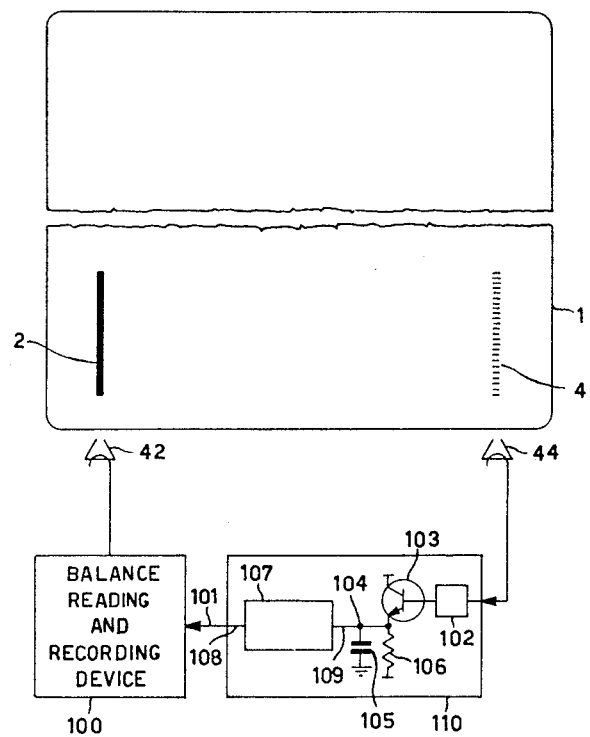
*INVENTOR.*
PIER GIORGIO PEROTTO
BY
*ATTORNEYS*

United States Patent Office 3,146,342
Patented Aug. 25, 1964

3,146,342
OLD BALANCE PICK-UP DEVICE FOR AN
ACCOUNTING MACHINE
Pier Giorgio Perotto, Turin, Italy, assignor to Ing. C.
Olivetti & C., S.p.A., Ivrea, Italy, a corporation of Italy
Filed Apr. 6, 1962, Ser. No. 185,634
Claims priority, application Italy Apr. 11, 1961
1 Claim. (Cl. 235—61.11)

The present invention relates to an accounting machine using a ledger card movable past a magnetic transducer and adapted to magnetically process balances on a magnetic track of said ledger card.

In the machines provided with such an automatic old balance pick-up device the balance resulting from an accounting transaction is both recorded in visible form on the ledger card and magnetically recorded on a magnetic track of the same ledger card, whereby said balance may be subsequently read-out from said track into the accounting machine prior to another accounting operation.

A problem encountered in said accounting machines is to provide means for signalling the presence of the magnetic track or of a selected portion thereof under the magnetic transducer in order either to avoid said transducer to be unduly operated in presence of nonmagnetic blank space of the card or to allow certain portions of the track to be distinguished from other portions thereof for selective recording purposes.

In some known machines the magnetic track has substantially the same length as the ledger card itself. This allows suitable mechanical sensing means responsive to the leading edge of the ledger card when the card is introduced into the machine to signal the presence of the magnetic track. However, such an arrangement of the magnetic track is wasteful of space.

In another known machine, wherein the magnetic balance track is located in a portion of the ledger card close to its leading edge, a clock track is additionally provided, said clock track being parallel to the balance track and having a magnetic mark permanently recorded therein for each possible mark or bit to be recorded on said balance track. This, however, renders the machine subject to errors when reading and recording, due either to the possible skew of the card, or the accidental sensing of spurious clock marks or, finally, to the accidental erasure of a few clock marks.

The primary object of the invention is to provide an accounting machine which overcomes these disadvantages.

A further object of the invention is to provide an accounting machine having an automatic old balance pick-up device which is of simple structure and reliable operation.

According to the invention I provide in an accounting machine of the class described a second track on the ledger card parallel to the first or balance track and including a sequence of equally spaced magnetic marks, means for sensing said marks as said ledger card is moved past said transducer, circuit means controlled by said sensing means and settable to a first voltage level in response to each one of said sensed marks, said circuit means being self-resetting to a second voltage level after a time delay greater than the time interval between the marks of a pair of consecutive sensed marks, and means responsive to said circuit means upon being so set to said first voltage level for enabling said transducer to operate.

This and other objects and features of the invention will become apparent from the following description of a preferred embodiment thereof, taken in conjunction with the accompanying drawing, which shows a partial diagram of the circuits used in the machine according to the invention.

The ledger card 1 comprises close to its leading edge, and thus on its lower portion in the case of a front-fed card, a first magnetic track 2 and a second magnetic track 4. The track 2 is used for recording an old balance resulting from an accounting transaction. Said old balance may be recorded on the track 2 according to a binary code respresentation, whereby asssuming said balance consists of 16 decimal digits each one represented by four bits, the track 2 is adapted to store a series of 64 bits.

The track 4 comprises, according to a first embodiment of the invention, a plurality of horizontal marks separated by blank paper spaces. Said marks are imprinted with a magnetizable ink like the ink used for the track 2, and are permanently magnetized, for instance by means of a permanent magnet not shown in the drawing and arranged on the carriage of the accounting machine in front of the track 4. Thus the track 4 includes a sequence of equally spaced magnetic marks, the vertical length covered by said sequence being not greater than the length of the track 2.

A magnetic transducer 42, 44 is associated with each track 2 and 4, respectively. Said transducers are arranged on the carriage of the accounting machine, said carriage being provided with a suitable ledger card front-feeding device adapted to vertically feed said card, whereby each time the card is introduced into the machine and positioned at the proper printing line, and each time the card is extracted therefrom, the magnetic tracks are completely scanned by the associated transducers.

The magnetic transducer 42 is connected to a balance reading and recording device 100 of any suitable structure, said device being adapted to receive from the transducer 42 the binary representation of the old balance recorded on the track 2 and to transmit said old balance to the accounting machine and to receive from the accounting machine a new balance and to transmit said new balance to the transducer 42 for recording. As such a device is well known in the art, it will not be described. For the purposes of the present disclosure it is sufficient to point out that said reading and recording device is arranged to be operative only in presence of an enabling signal fed to its input terminal 101, whereby it will be apparent that the transducer 42 is normally inoperative.

Therefore, by properly controlling the duration of said enabling signal, erroneous recording on blank paper may be avoided; in the same way both the reading and recording operations may be limited to a predetermined extent of the track 2.

The transducer 44 feeds a circuit 110 of the type designated by the numeral 47 in the copending application S.N. 119,432, filed June 26, 1961. More particularly, said transducer 44 feeds a conventional amplifier 102 which provides a square pulse in response to each mark sensed on the track 4. Each square pulse is sent, through an emitter-follower 103, to charge a terminal 104 of a condenser 105 to a first predetermined voltage level. After each square pulse the condenser 105 is discharged through the resistance 106. The time constant of said discharge process is so arranged that the condenser is discharged from said first predetermined voltage level to a second predetermined voltage level in a time greater than the time interval between the square pulses of a pair of consecutive marks.

An amplifying circuit 107, adapted to produce on its output 108 a signal only when its input 109 has a voltage level greater than said second predetermined level, has its input 109 and its output 108 connected to the condenser 105 and to the input terminal 101 of the device 100, respectively. Said amplifying circuit 107 may be a Schmitt trigger of the type disclosed on pages 164 to 168 of the book "Pulse and Digital Circuits," by J. Millman and H. Taub, McGraw-Hill, 1956, said circuit being adapted to be set to a predetermined state for providing an output signal in response to an input signal having a level greater than said second level, and to be reset to another state in response to an input signal having a level lower than said second level. As the signal on the input 109, that is the actual voltage level of the terminal 104 of the condenser, reaches automatically said second level after a predetermined time interval after each square pulse produced by the amplifier 102, it is apparent that the circuit 107 is set in response to each sensed mark, and is self resetting after a predetermined time delay, which, as previously stated, is greater than the time interval between the marks of a pair of consecutive sensed marks.

It is thus apparent that said condenser 105, which is normally discharged, is charged to said first predetermined voltage level by the first square pulse of the sequence of square pulses obtained from the amplifier 102 when scanning the track 4, and is discharged under said second voltage level only after the last square pulse of said sequence.

Therefore, on the output 108 a signal is obtained, which begins with said first square pulse and ends with said last square pulse. Said signal is used as an enabling signal for the device 100.

Provided the spacing between consecutive magnetic marks on the track 4 is not too large, it is obvious that the device according to the invention is operative irrespective of the accidental erasure of a few marks.

Furthermore, it is obvious to those skilled in the art that any suitable circuit may be substituted for the circuit 110 fed by the transducer 44, provided said circuit is settable in response to each sensed mark and is self-resetting after a time delay greater than the time interval between the marks of a pair of consecutive sensed marks.

According to another or preferred embodiment of the invention, the track 4 is made of a continuous thick line imprinted with magnetizable ink like the track 2, and having permanently recorded thereon a plurality of marks represented by any suitable pattern of magnetization, which may be for instance single square pulses. One way of recording said marks, is to connect the transducer 44 to the recording means 160 prior to using the first time a ledger card, and then to drive said recording means so as to record a series of binary "ones," that is a series of square pulses, on the track 4.

It should be understood that the foregoing disclosure relates to only a preferred embodiment of the invention and that it is intended to cover all changes and modifications of the example of the invention herein chosen for the purposes of the disclosure, which do not constitute departures from the spirit and scope of the invention.

What I claim is:

In an accounting machine using a ledger card movable past a normally inoperative magnetic transducer and adapted to magnetically process balances on a magnetic track of said ledger card, the combination comprising:

(a) a second track on said ledger card parallel to said first named track and including a sequence of equally spaced magnetic marks, (b) means for sensing said marks as said ledger card is moved past said transducer, (c) circuit means controlled by said sensing means and settable to a first voltage level in response to each one of said sensed marks, said circuit means being self-resetting to a second voltage level after a time delay greater than the time interval between the marks of a pair of consecutive sensed marks, (d) and means responsive to said circuit means upon being so set to said first voltage level for enabling said transducer to operate.

No references cited.